United States Patent
D'Acquisto

(10) Patent No.: US 10,316,543 B2
(45) Date of Patent: Jun. 11, 2019

(54) POLE RETAINER SYSTEM

(71) Applicant: Andrae T. D'Acquisto, Bellevue, IA (US)

(72) Inventor: Andrae T. D'Acquisto, Bellevue, IA (US)

(*) Notice: Subject to any disclaimer, the term of this patent is extended or adjusted under 35 U.S.C. 154(b) by 0 days.

(21) Appl. No.: 15/799,695

(22) Filed: Oct. 31, 2017

(65) Prior Publication Data
US 2018/0050400 A1 Feb. 22, 2018

Related U.S. Application Data

(63) Continuation of application No. 14/630,637, filed on Feb. 24, 2015, now abandoned.

(60) Provisional application No. 61/943,585, filed on Feb. 24, 2014.

(51) Int. Cl.
| | | |
|---|---|---|
| *E04H 15/48* | (2006.01) | |
| *B23D 49/14* | (2006.01) | |
| *B23D 51/03* | (2006.01) | |
| *B23D 51/10* | (2006.01) | |
| *B26B 1/04* | (2006.01) | |
| *A01G 3/08* | (2006.01) | |
| *B23D 61/12* | (2006.01) | |

(52) U.S. Cl.
CPC ............ *E04H 15/48* (2013.01); *A01G 3/083* (2013.01); *B23D 49/14* (2013.01); *B23D 51/03* (2013.01); *B23D 51/10* (2013.01); *B26B 1/046* (2013.01); *B23D 61/123* (2013.01)

(58) Field of Classification Search
CPC ..................................................... E04H 15/48
USPC .................................. 135/135, 147; 403/170
See application file for complete search history.

(56) References Cited

U.S. PATENT DOCUMENTS

| | | | | |
|---|---|---|---|---|
| 3,766,932 A * | 10/1973 | Sidis | ..................... | E04B 1/1903 135/147 |
| 4,637,748 A * | 1/1987 | Beavers | ................ | E04B 1/1903 135/147 |
| 4,998,552 A * | 3/1991 | Niksic | ................... | E04B 1/3441 135/136 |
| 5,069,572 A * | 12/1991 | Niksic | ................... | E04H 15/425 135/147 |
| 5,361,794 A * | 11/1994 | Brady | ..................... | E04H 15/48 135/147 |
| 6,296,415 B1 * | 10/2001 | Johnson | ................ | E04B 1/3441 135/901 |
| 7,841,572 B2 * | 11/2010 | Chen | .................... | A63H 33/006 248/284.1 |

(Continued)

*Primary Examiner* — Noah Chandler Hawk
(74) *Attorney, Agent, or Firm* — Rathe Lindenbaum LLP

(57) ABSTRACT

A spider hub pole retaining assembly may include a hub, poles and a retainer. The hub may include channels extending radially outward in a plane. The poles maybe pivotably coupled to the hub near a center of the hub so as to be pivotable between a first position in which the poles extend radially outwardly through the channels in the plane and a second position in which the poles extend away from the outside of the channels. The retainer may include a top rotatably supported by the hub and hooks extending from the top. The top is rotatable between a retaining position in which the hooks receive the poles when the poles are in the first position and a releasing position in which the hooks are angularly offset with respect to the channels to facilitate withdrawal of the poles from the channels.

14 Claims, 17 Drawing Sheets

(56) References Cited

U.S. PATENT DOCUMENTS 8,360,085 B2 * 1/2013 Lee ........................ E04H 15/48
135/135

* cited by examiner

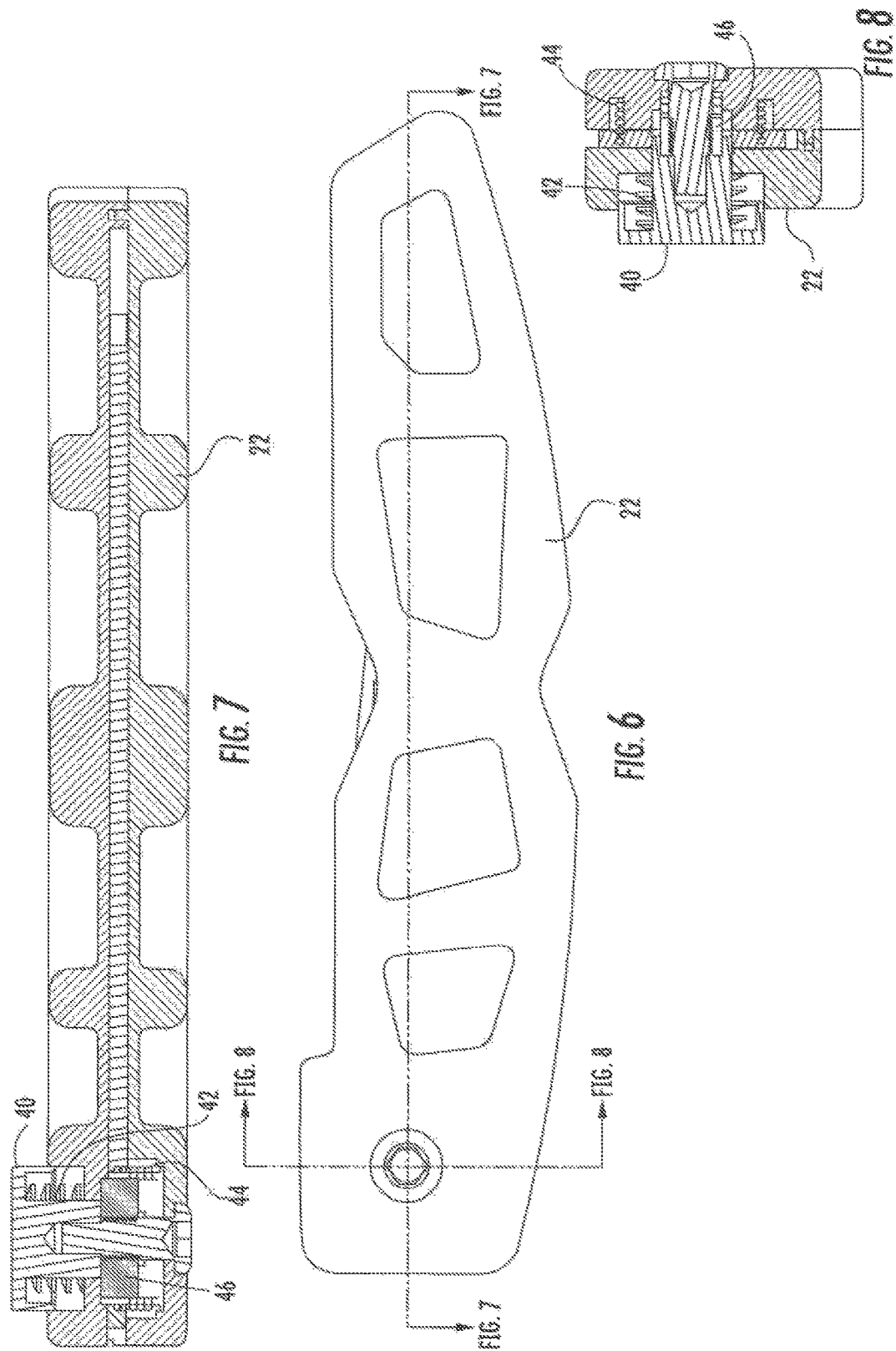

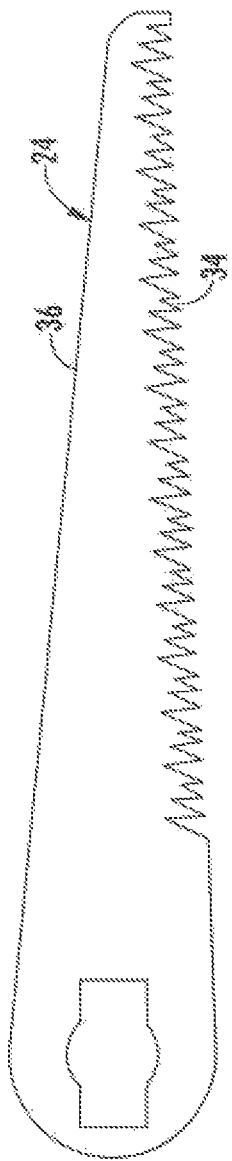
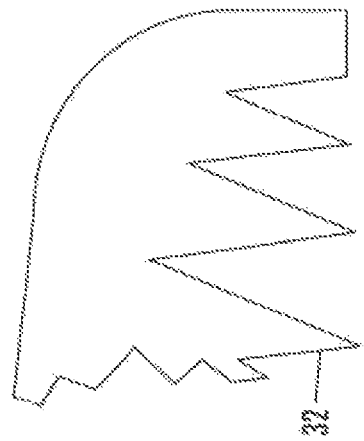
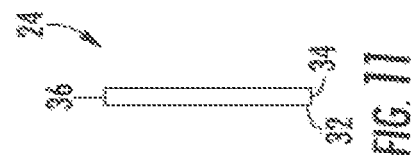
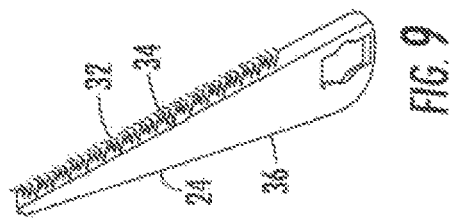

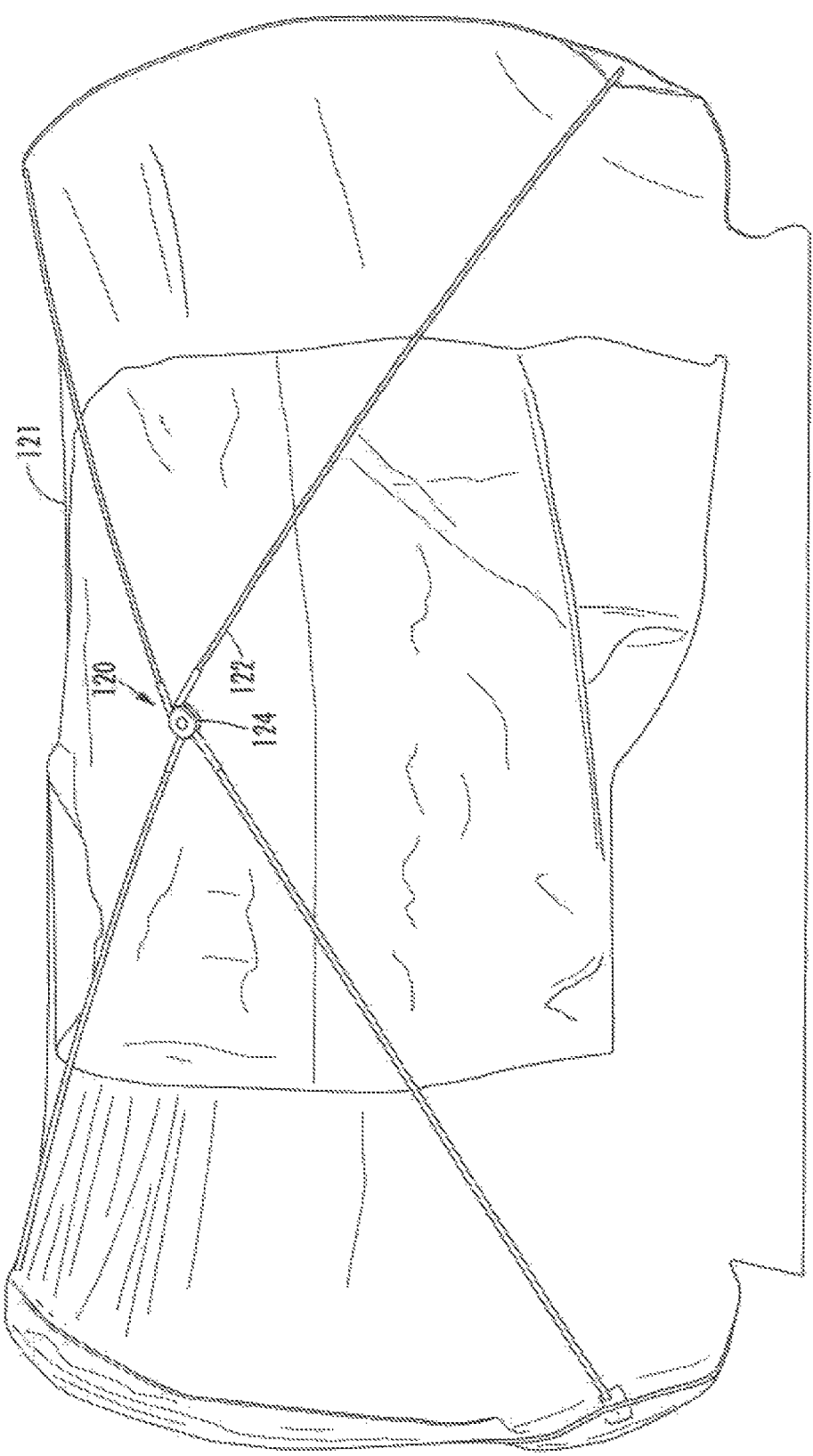

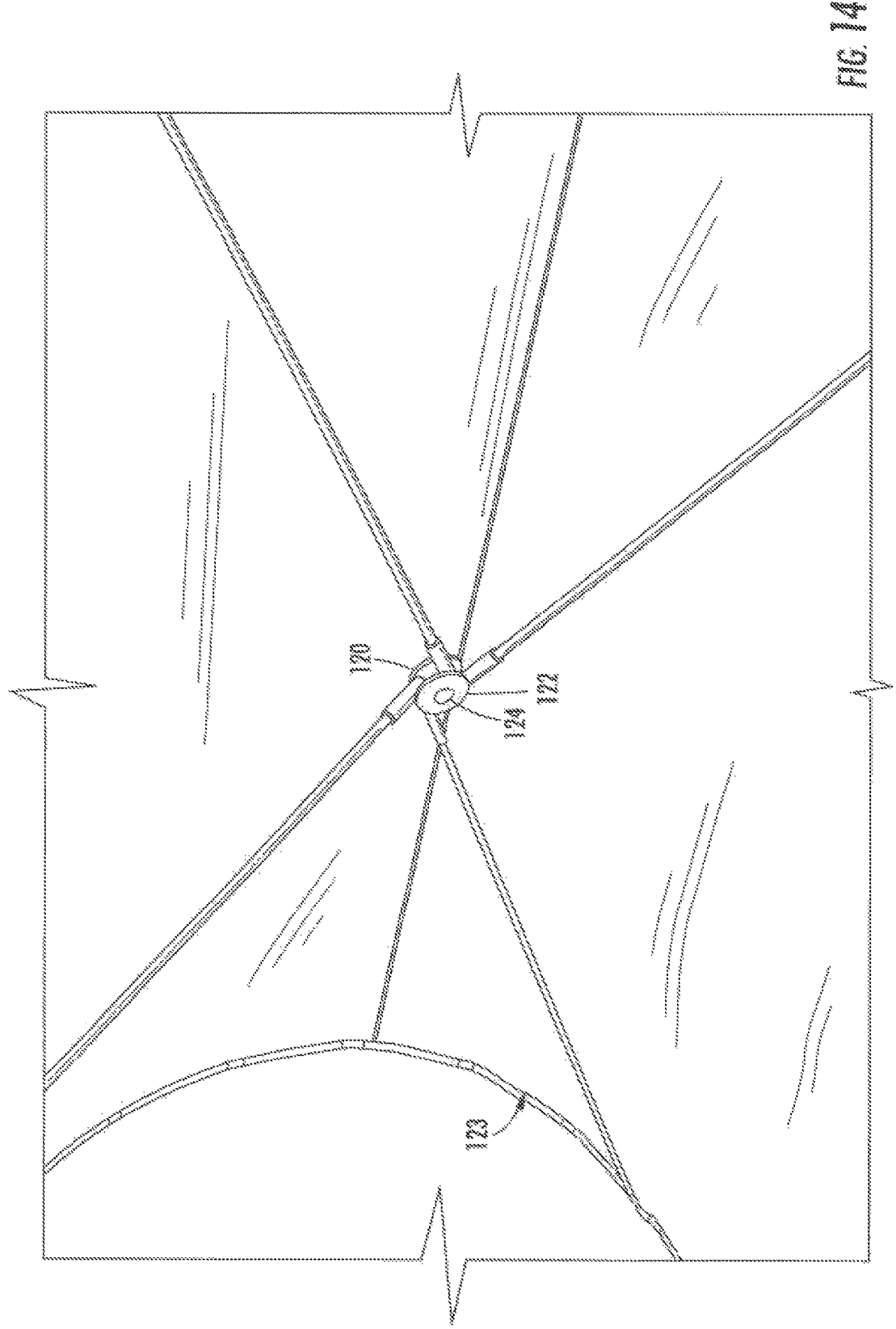

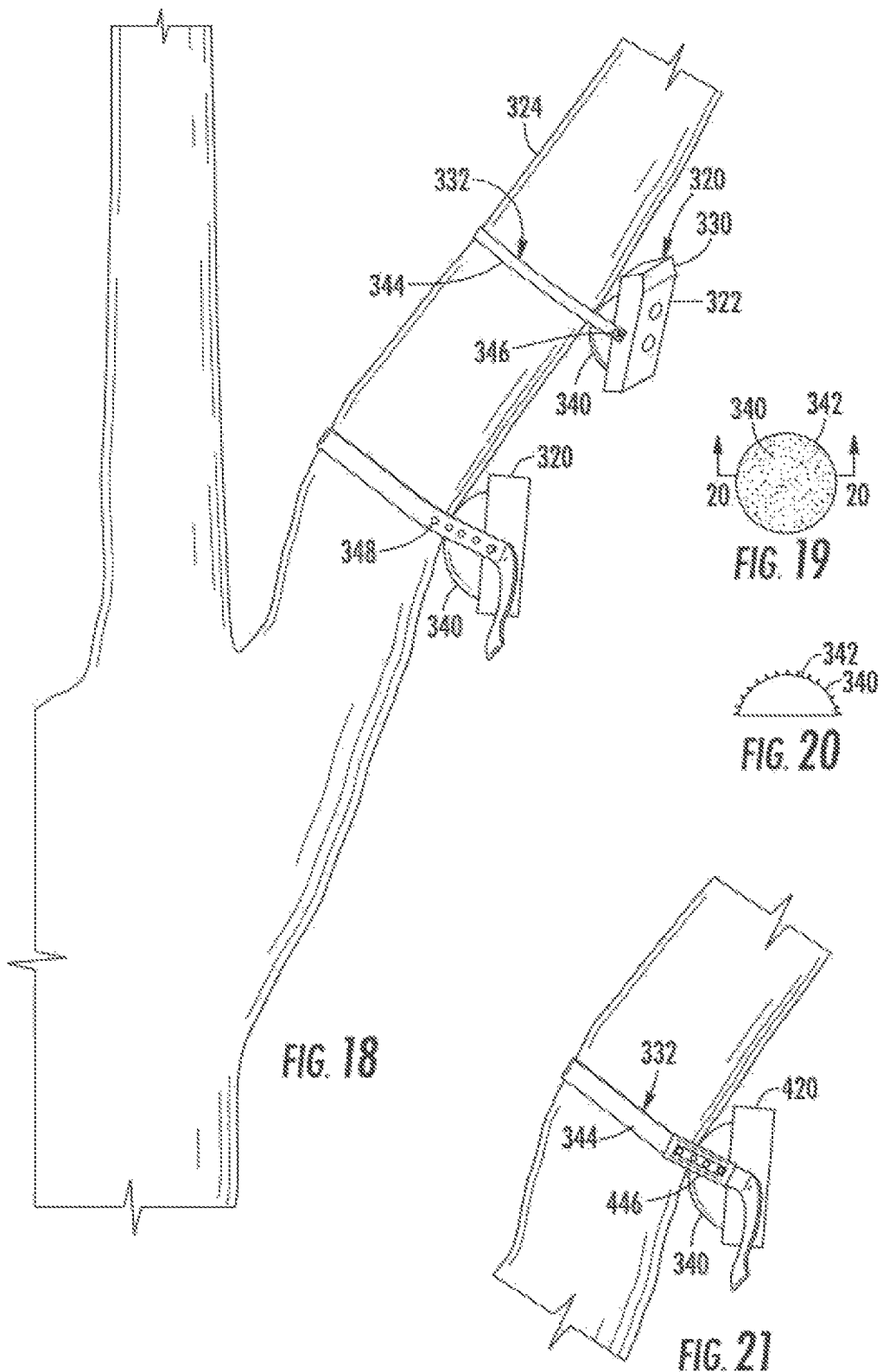

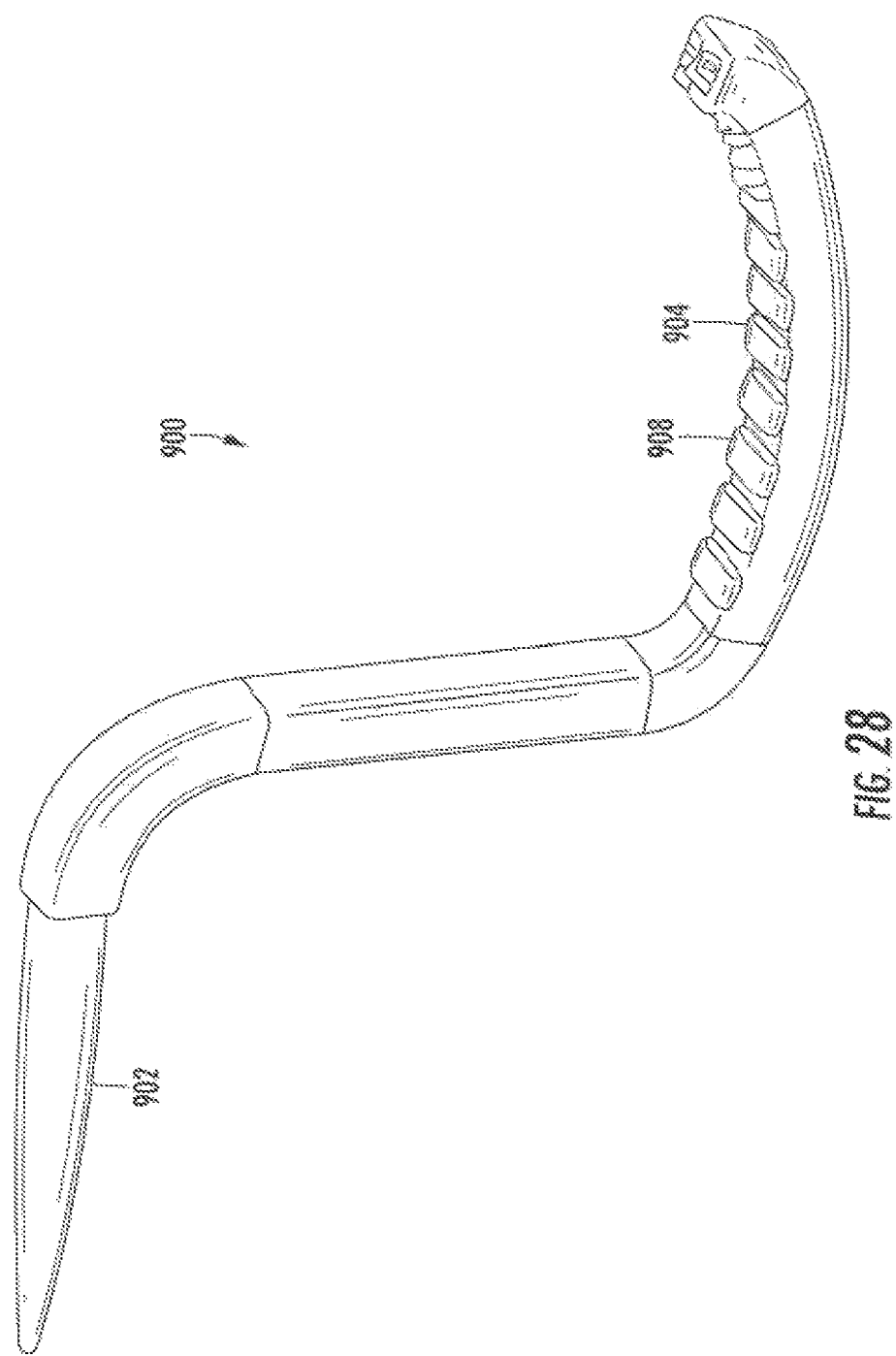

US 10,316,543 B2

POLE RETAINER SYSTEM

CROSS-REFERENCE TO RELATED PATENT APPLICATIONS

The present continuation application claims priority under 35 USC 120 from U.S. patent application Ser. No. 14/630,637 filed on Feb. 24, 2015 by Andrae T. D'Acquisto and entitled HUNTING ACCESSORIES which claimed priority under 35 USC 119 from and was a non-provisional application of U.S. Provisional Patent Application Ser. No. 61/943,585 filed on Feb. 24, 2014 by Andrae T. D'Acquisto and entitled CAM LOCK, FOLDING, HUB LOCKING MECHANISM AND TRAIL CAMERA ARM, the full disclosures both of which are hereby incorporated by reference.

BACKGROUND

During hunting or wildlife observation, it is often difficult and tedious to establish and maintain a post to observe wildlife. For example, setting up a tree stand often requires a person to climb in position himself or herself in a tree, wherein branches may obstruct the positioning of the tree stand. Alternatively, positioning a camera in a tree to observe wildlife present his own challenges. In addition to the camera being potentially obstructed by tree branches, the camera may also be difficult to position at a desired angle given variations in tree diameters and tree angles. Carrying and utilizing implements to trim such branches at such high elevations is extremely difficult. Should the person desire to set up a blind, tent or other concealing shelter on the ground, such shelters are subject to accidental collapse in response to high winds.

BRIEF DESCRIPTION OF THE DRAWINGS

FIG. 6 is a side view of the trim saw of FIG. 1.

FIG. 7 is a sectional view of the trim saw of FIG. 6 taken along line B-B.

FIG. 8 is a sectional view of the trim soft FIG. 6 taken along line A-A.

FIG. 9 is a perspective view of a blade of the trim saw of FIG. 1.

FIG. 10 is a side view of the trim saw of FIG. 1.

Fear 11 is an end view of the trim saw of FIG. 10.

FIG. 12 is an enlarged fragmentary side view of the trim saw of FIG. 10.

FIG. 13 is a perspective view of an example blind and an example spider hub pole retainer assembly.

FIG. 14 is a perspective view of another example blind and the example spider hub pole retainer assembly.

Figure 15:
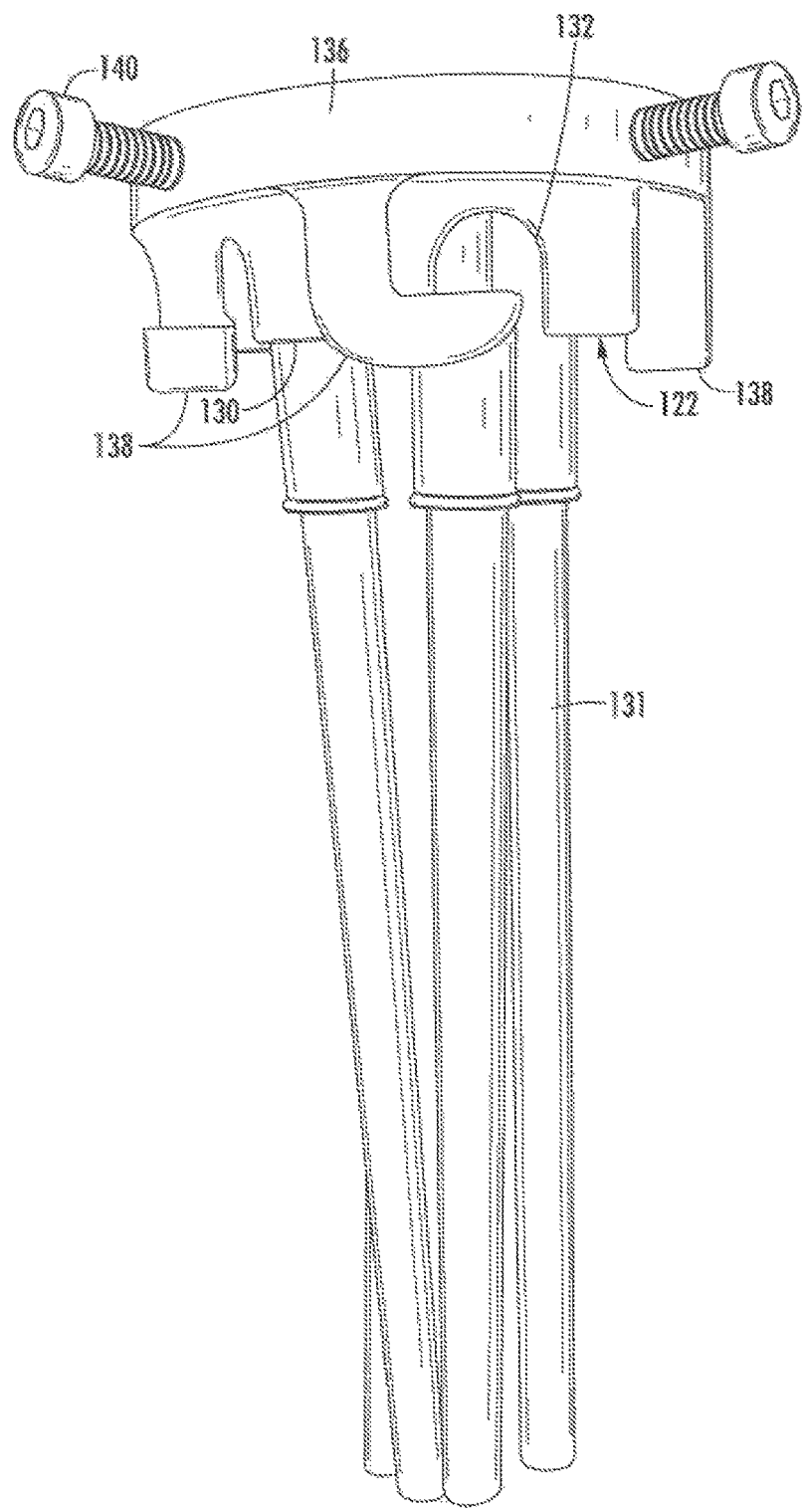

FIG. 15 is a perspective view of the spider hub pole retainer assembly.

Figure 16:
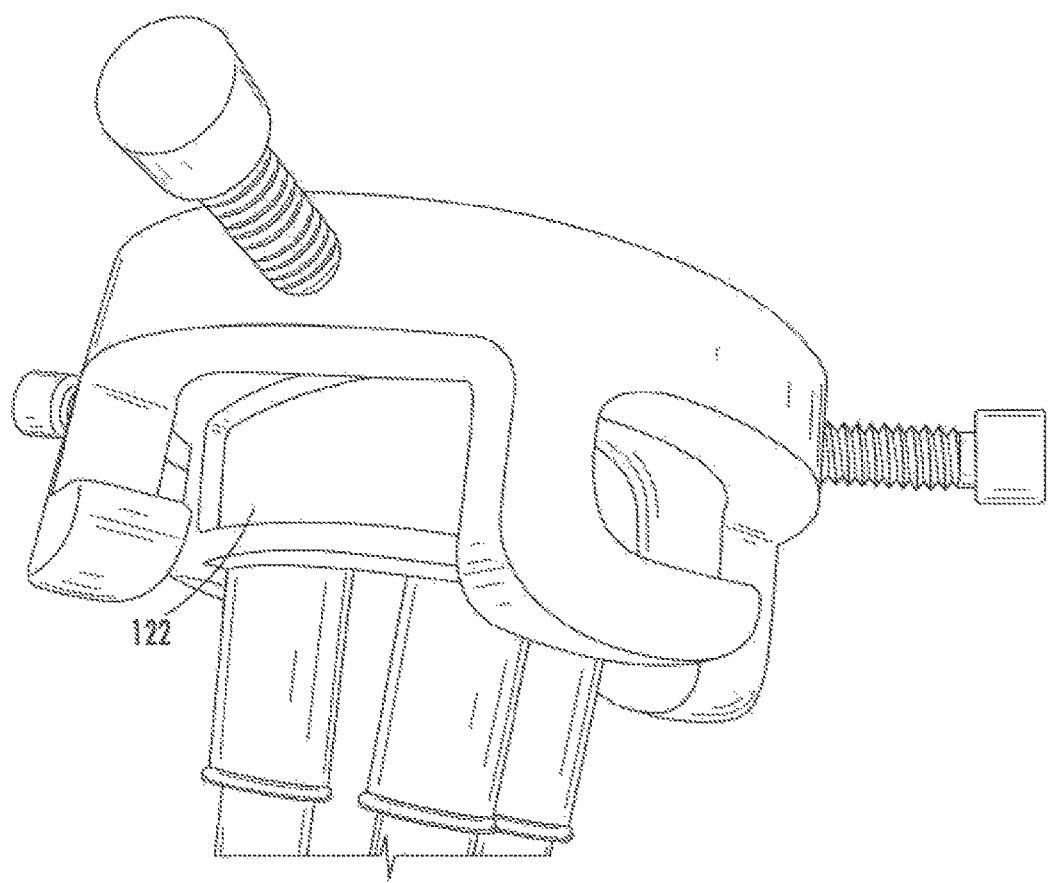

FIG. 16 is an enlarged view of a portion of the spider hub pole retainer assembly of FIG. 15.

Figure 17:
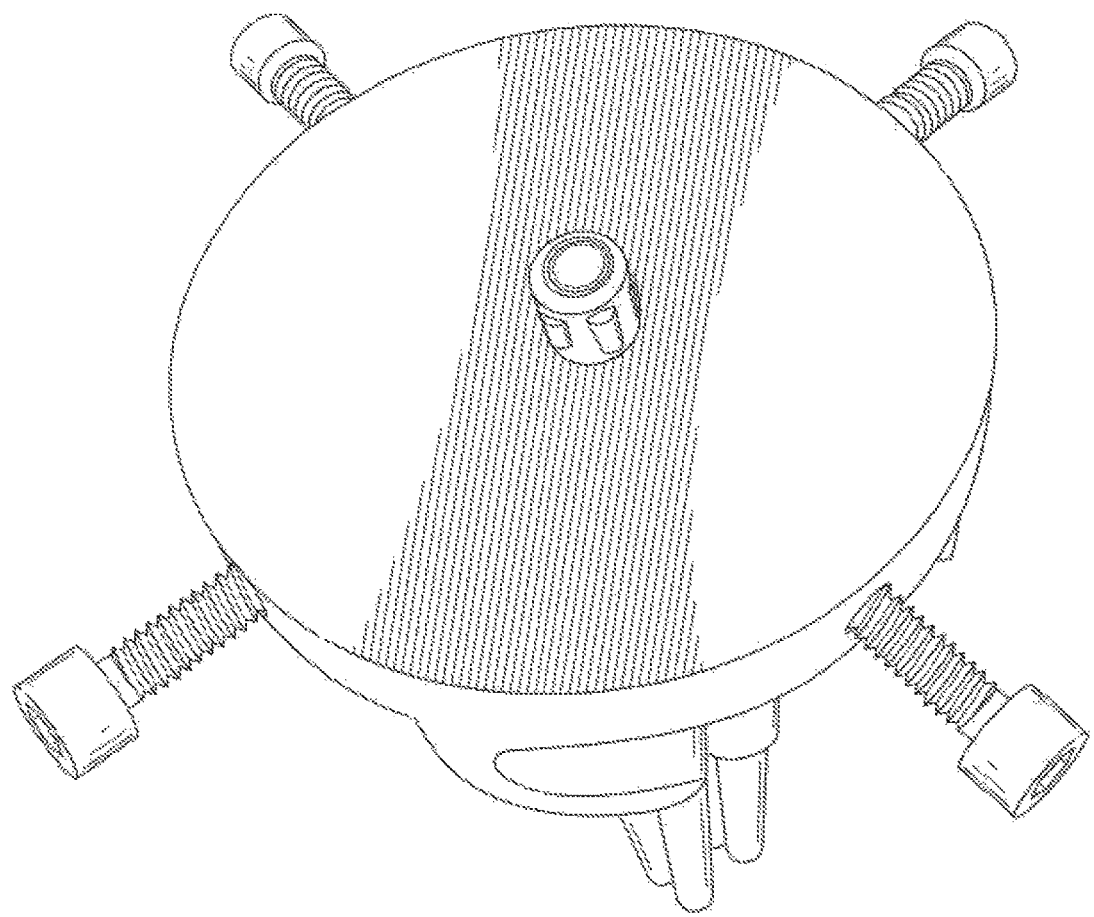

FIG. 17 is a top perspective view of the spider hub pole retainer assembly of FIG. 15.

FIG. 18 is a perspective view of an example camera tree mounts along an example tree.

FIG. 19 is a rear view of an example rear surface of a camera support of the crammer tree amount of FIG. 18.

FIG. 20 is a sectional view of the rear surface of FIG. 19 taken along line 20-20.

FIG. 21 is a side view of another example camera tree mount mounted to a tree.

Figure 22:
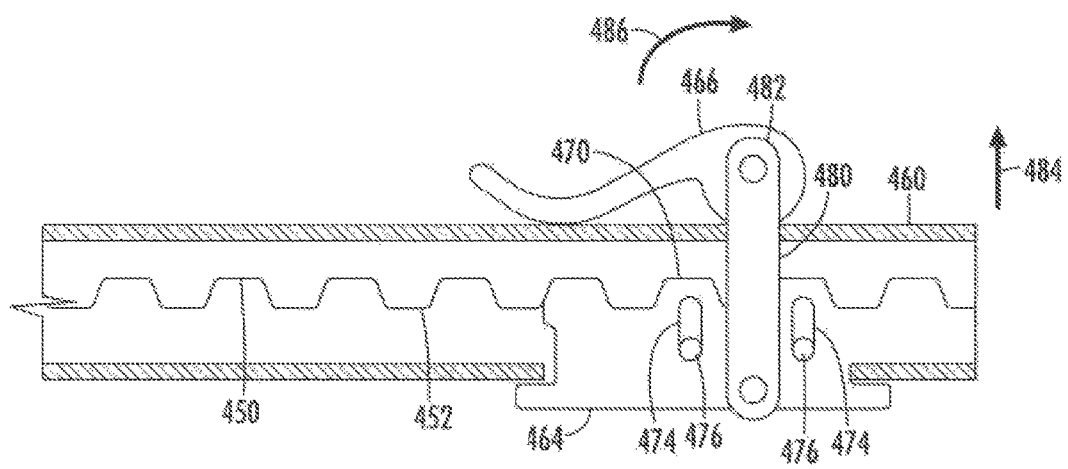

FIG. 22 is a sectional view of an example tree wrap and retainer of the camera tree amount of FIG. 21.

Figure 23:
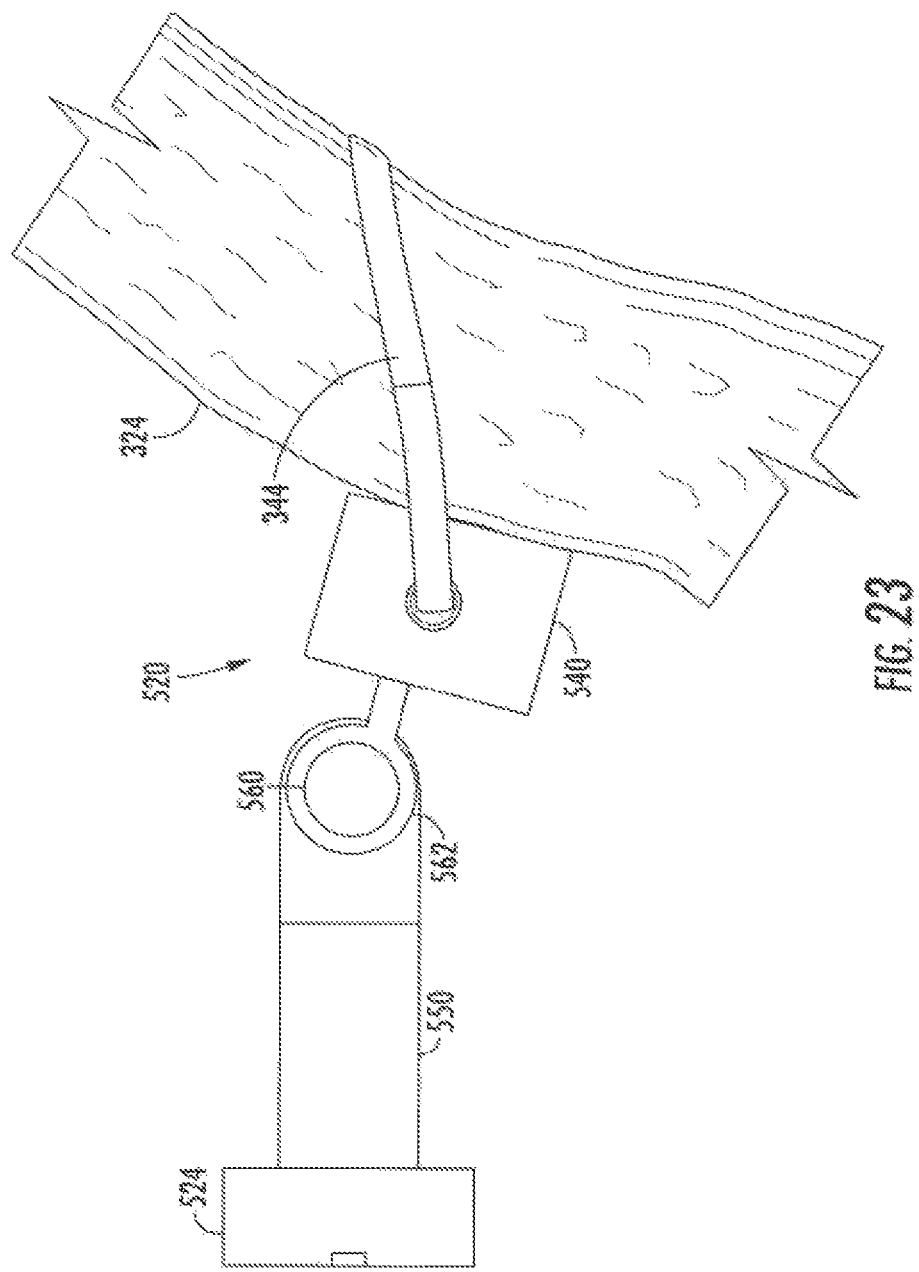

FIG. 23 is a side view of another example camera tree mount.

Figures 24, 25:
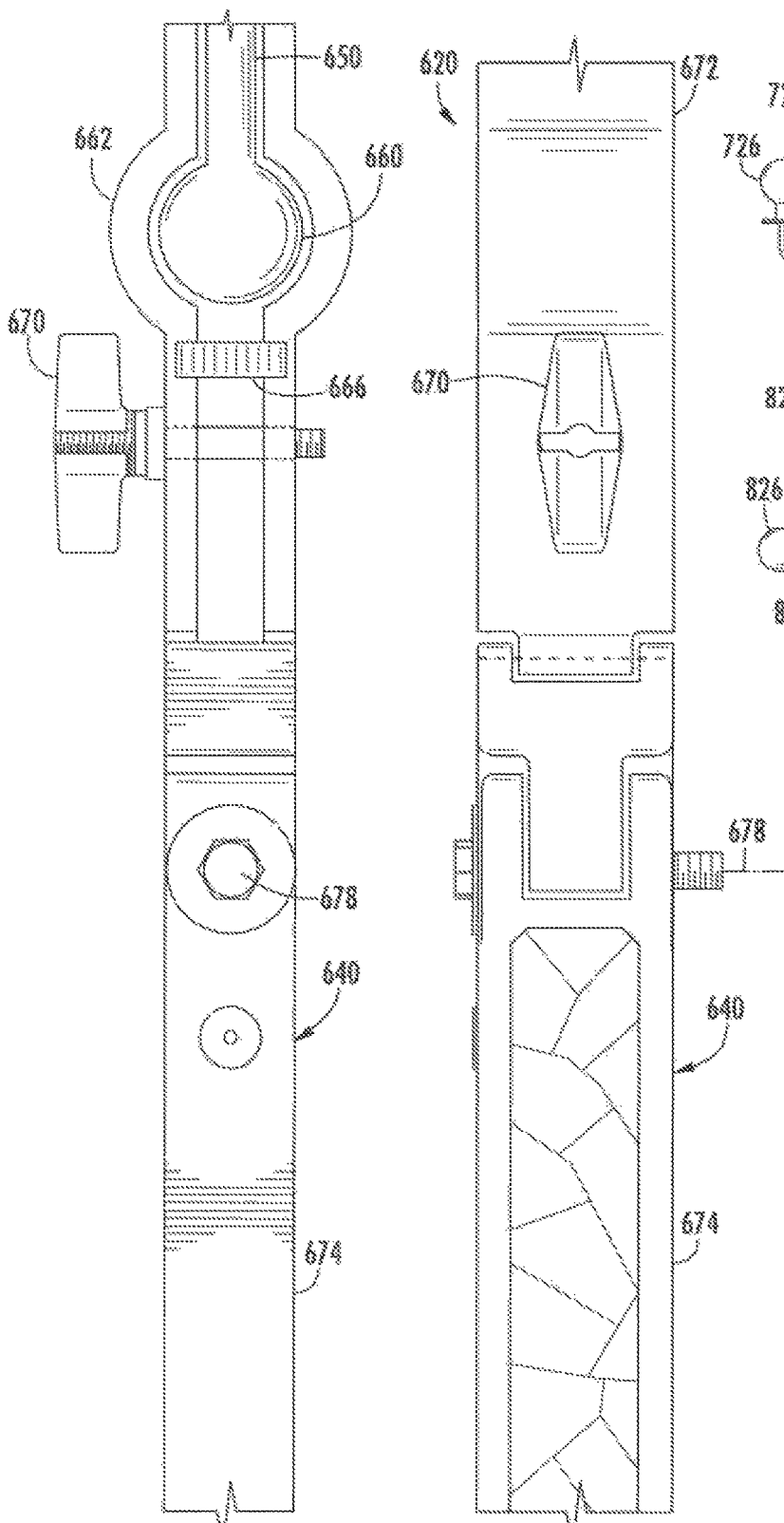

FIG. 24 is a side view of another example camera tree mount.

FIG. 25 is a top view of the camera tree mount of FIG. 24.

Figure 26:
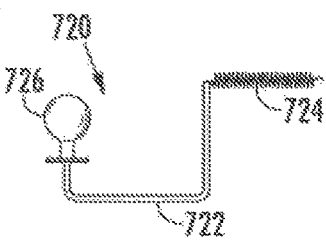

FIG. 26 is a side view of another example camera tree mount.

Figure 27:
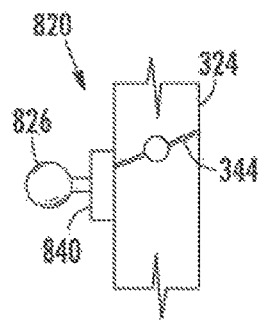

FIG. 27 is a side view of another example camera tree mount.

FIG. 28 is a perspective view of an example tree climbing step.

DETAILED DESCRIPTION OF EXAMPLES

Figure 1:
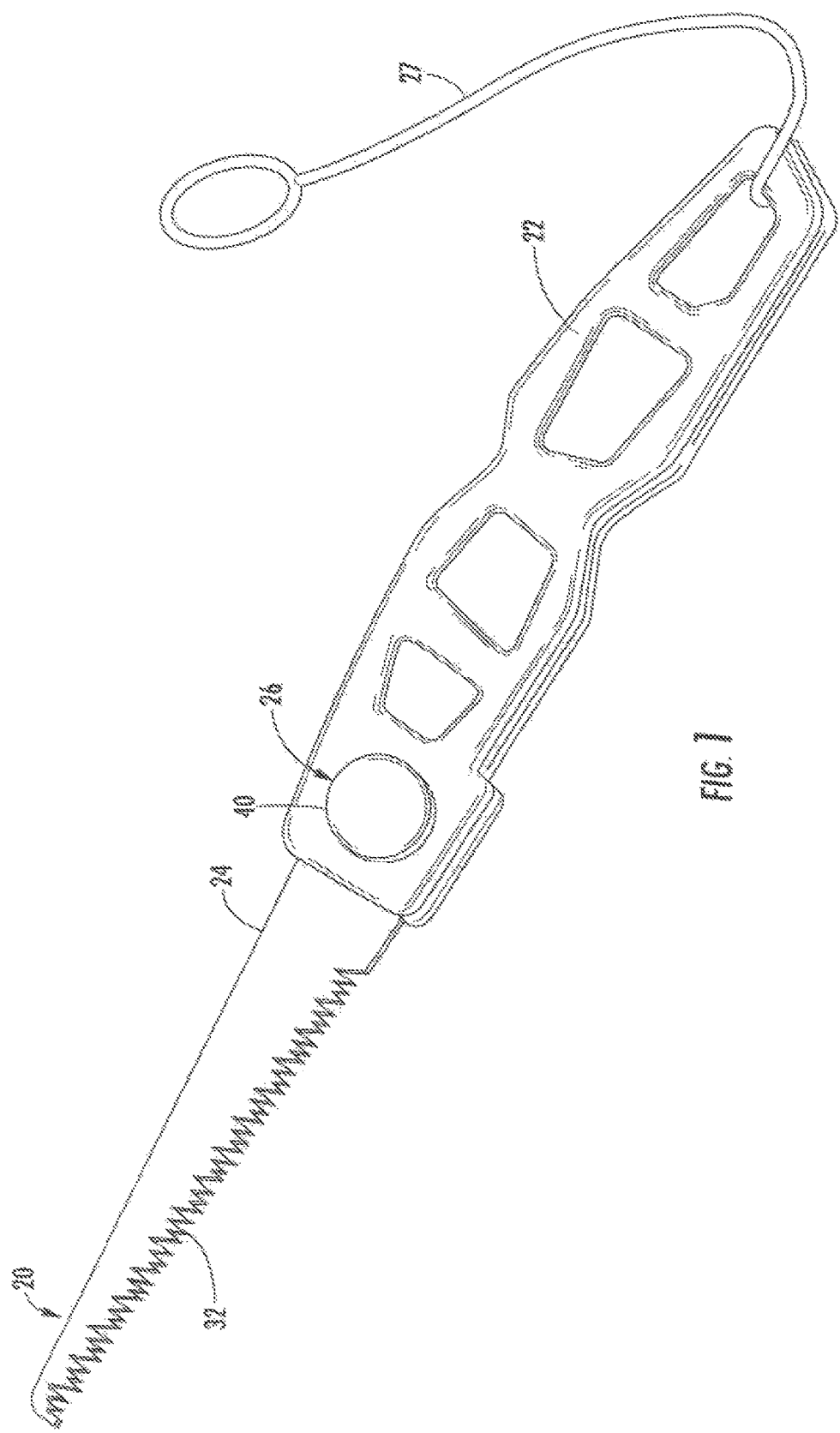
FIG. 1 is a perspective view of an example trim saw.
Figure 2:
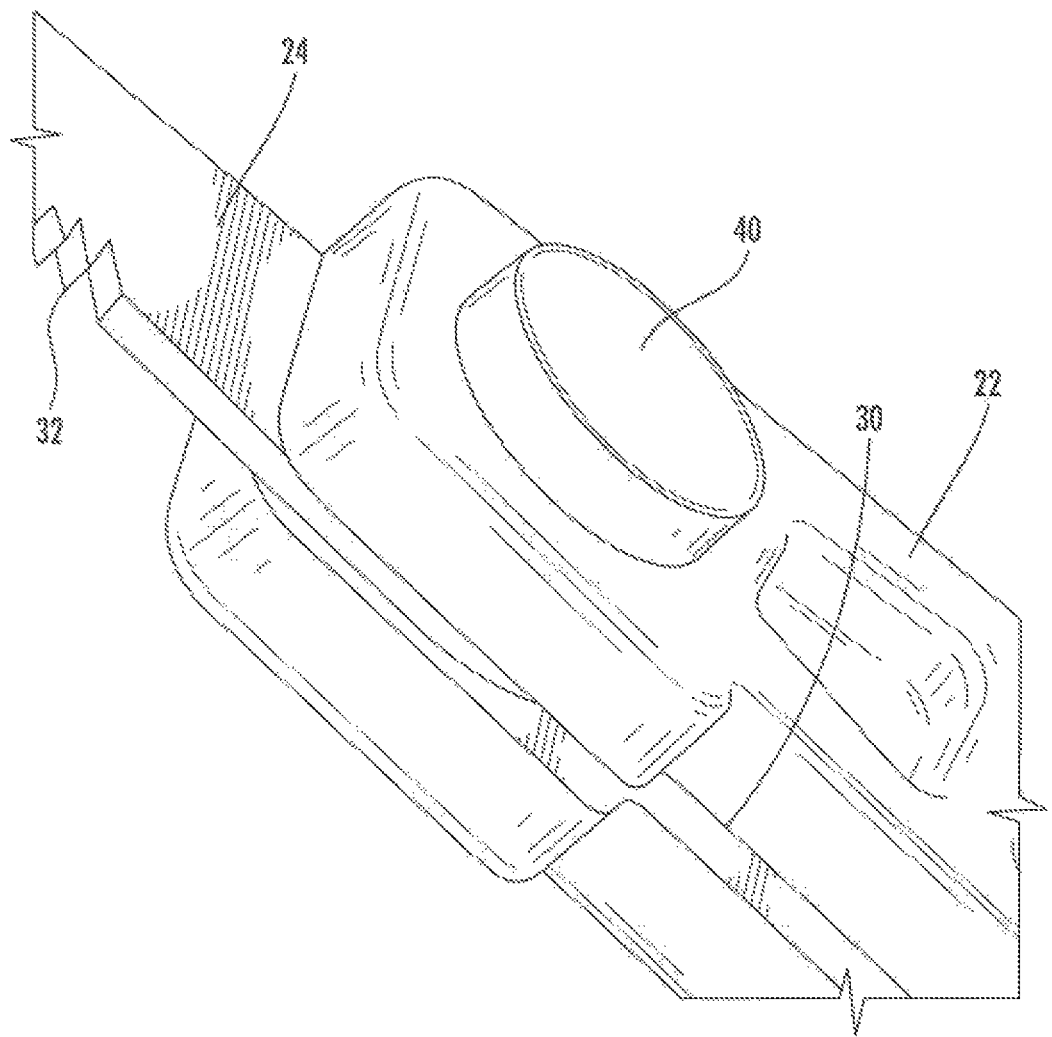
FIG. 2 is an enlarged perspective view of a portion of the trim soft FIG. 1.

FIG. 1 is a perspective view of an example trim saw 20. Trim saw 20 is configured to be easily handled and carried up a tree while in a closed state. Trim saw 20 is configured to be easily opened and closed using a single hand, allowing a person to maintain his or her grip upon the tree being climbed. Trim saw 20 comprises handle 22, blade 24, blade retainer mechanism 26 and tether 27.

Handle 22 supports blade 24 and includes a slot 30 into which blade 24 may be pivoted and received. Handle 22 houses and supports blade retainer mechanism 26. In the example illustrated, handle 22 comprises a molded polymer handle. In other implementations, handle 22 may have other configurations.

Blade 24 comprises teeth 32 configured to saw branches of a tree. Blade 24 is pivotally connected to handle 22 for pivotal movement between a received position such as shown in FIG. 6 and an extended position such as shown in FIG. 1. FIGS. 9-12 illustrate blade 24 in more detail. As shown by FIG. 12, teeth 32 have an aggressive bite to facilitate cutting of tree branches. As shown by FIG. 11, in one implementation, blade 24 comprises a first edge 34 having teeth 32 and a second opposite edge 36. The edge 34 including teeth 32 has a first width that is greater than the width of edge 36. In one implementation, blade 24 gradually tapers from edge 34 to edge 36. In another implementation, the transition in the thickness of the blade or width of the edges from edge 34 to 36 may be stepped or curved. Because the edge contains teeth 32 is wider or thicker than the back of blade 24, blade 24 is less likely to become pinched as the tree branch is cut and is collapsing upon blade 24.

Figure 4:
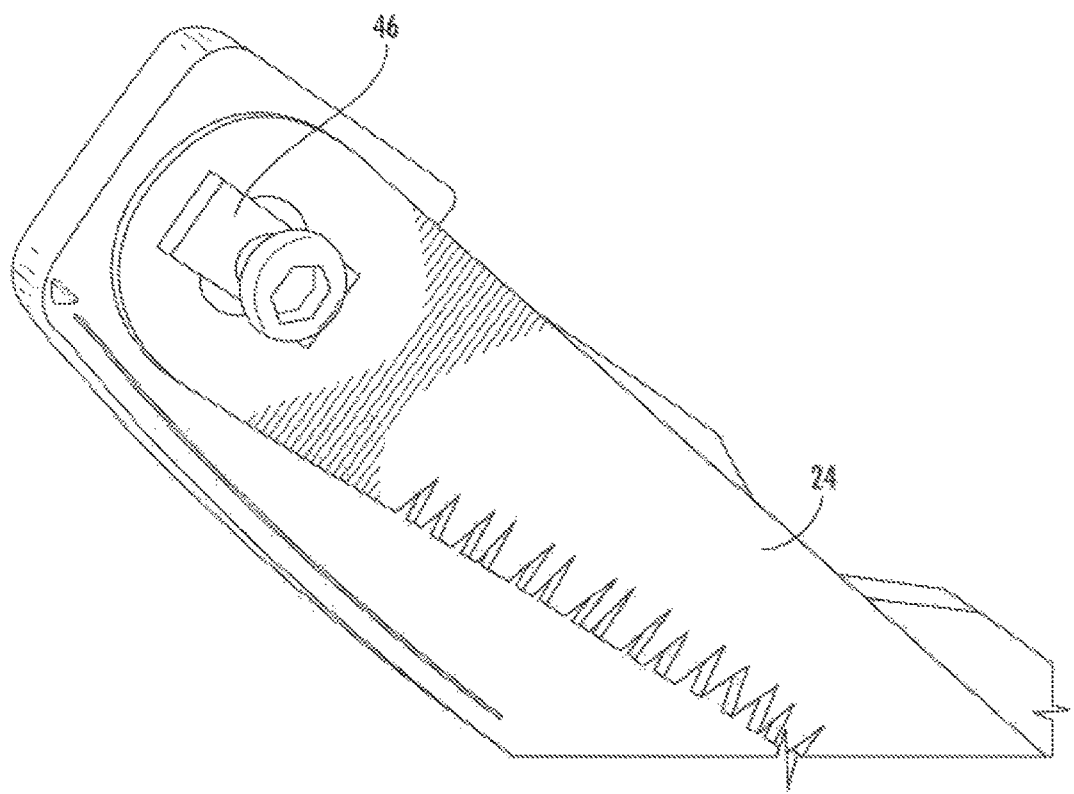
FIG. 4 is a perspective view of the trim soft FIG. 1 in a folded state with portions omitted for purposes of illustration.
Figure 5:
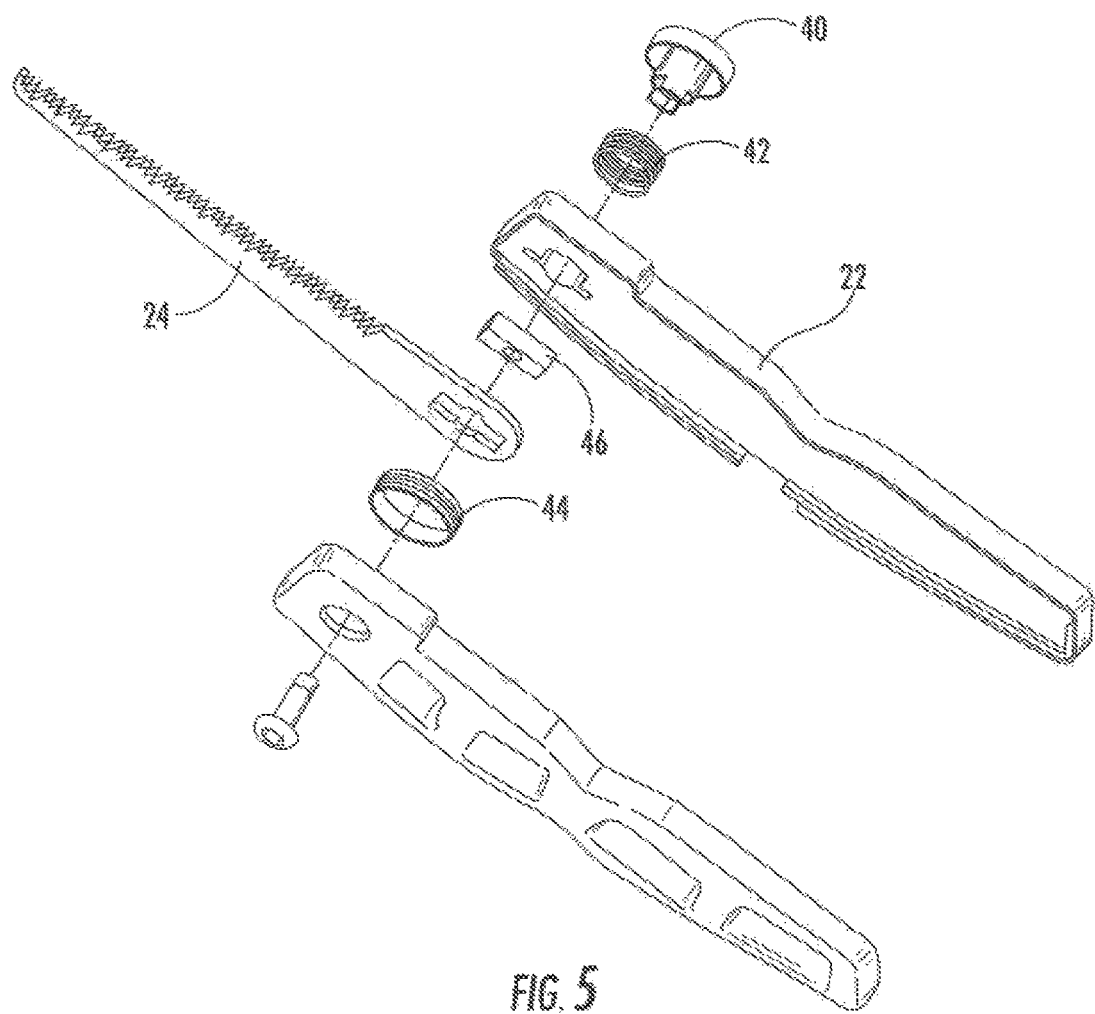
FIG. 5 is an exploded perspective view of the trim saw of FIG. 1.

Blade retainer mechanism 26 releasably retains blade 24 in the received or folded position shown in FIGS. 4 and 6. Blade retainer mechanism 26 comprises a single pushbutton 40 projecting from one side of handle 22 and a blade retainer 46. Pushbutton 40, upon being depressed, causes blade retainer 46 to release blade 24, permitting blade 24 to be pivoted to the extended position. In one implementation, depressed a pushbutton 40 permits blade 24 to be swung or flipped out of recess 30 to the extended position shown in FIG. 1. As a result, trim saw 20 is easily deployable by one hand while the person is hanging from a tree cutting undesirable branches or foliage.

FIGS. 3, 4, 5, 7 and 8 illustrate blade retainer mechanism 26 in more detail. The basic function of the saw 20 is controlled by the actuation of a large button 40 located the side of the saw 20 at the blade pivot. The button 40 is designed allow the blade 24 to open easily with one hand by holding the saw 20 with right hand and pressing with the right thumb. The button 40 can also be actuated with the left hand using the left index finger. The button 40 is sized and placed such that a single gloved hand can actuate the button. Spring force for the button is provided by a standard wave spring 42 to bias the button 40 outward.

Figure 3:
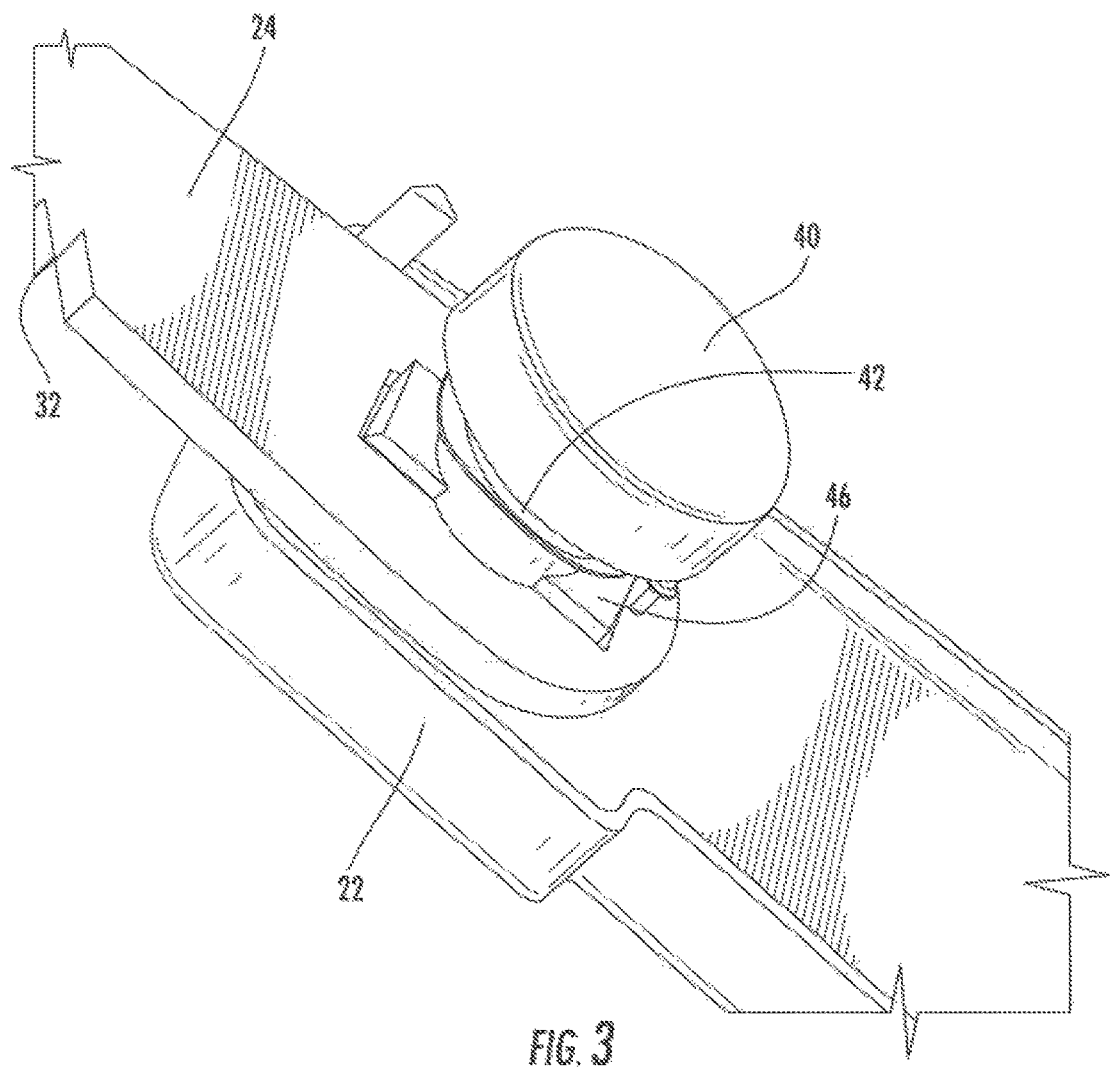
FIG. 3 is a perspective view of the trim soft FIG. 1 with portions omitted for purposes of illustration.

Once the button 40 has been fully depressed, internally the "lock" component slides out of the blade allowing the blade to pivot into the open position under the aid of the torsion spring 44. The blade motion is halted by a feature in the handle. The blade 40 is fixed into the open position by the lock component returning into the blade when the button is released. It is important to note that once the blade has been actuated by pushing the button, the button may be released at any point and the saw will automatically lock. FIG. 3 illustrates the internals of the saw by removing one of the handle sides; the lock component 46 in the locked position and the blade stop feature on the handle.

Closing the blade 24 is accomplished by pressing the button 40, thus releasing the blade 24, and pivoting the blade 24 back into the handle 22. The button 40 may be released at any point once the user has begun to close the blade and the saw will automatically lock closed when the blade 24 has been moved into the closed position (shown in FIG. 6).

FIGS. 13-14 illustrate an example spider hub pole retainer assembly 120 in a deployed state for use in a wildlife observation or hunting blind 121 (shown in FIG. 13) or 123 (shown in FIG. 14) in which poles of the spider of assembly are extended to maintain vinyl, canvas or fabric panels in an extended or expanded state. As shown by FIG. 13, the spider hub pole retainer assembly 120 is coupled to an exterior of blind 121 such that assembly 120 is coupled to a panel of blind 121 exterior to the panel of blind 121 and the interior of the enclosure formed by blind 121.

FIGS. 15-17 illustrate spider hub pole retainer assembly 120 in more detail. Spider hub pole retainer assembly 120 comprises a spider hub assembly 122 and a spider hub pole retainer 124. Spider hub assembly 122 comprises hub 130 and poles 131. Hub 130 comprises a structure having a plurality of channels 132 extending radially outward in a plane. Poles 131 are pivotably coupled to hub 130 near a center of hub 130. Poles 131 are pivotable between a first position in which the poles extend radially outwardly through the channels 132 (as shown in FIGS. 13 and 14) and a second position in which the poles extend away from an exterior to the channels as shown in FIG. 15.

Spider hub pull retainer 124 comprises a mechanism joined to hub 130 to retain poles 131 in the first position within the channels. Spider hub pole retainer 124 comprises top 136, hooks 138 and top position retainer 140. Top 136 comprise a plate, panel, cylinder or cap rotatably supported upon hub 130 for rotation about an axis perpendicular to hub 130. Hooks 138 extend from top 136 and are sized to receive the diameter of poles 131 when poles 131 are extended through channels 132. Top 136 is rotatable relative to hub 130 to rotate hooks 138 between a retaining position and a releasing position. In the retaining position, each of hooks 138 extends option to and across a corresponding one of channels 132 and receives the corresponding pole 131 to retain the corresponding pole 131 in the corresponding channel 132. In the releasing position, hooks 138 are annually offset from their corresponding channels 132 to facilitate pivoting of poles 132 into and out of channels 132 without interference from hooks 138.

Top position retainer 140 comprise a mechanism to releasably retain top 136 and hooks 138 in a selected rotational or angular position relative to hub 130. In the example illustrated, top position retainer 140 comprises a series of screws or bolts radically passing through top 136 into abutment and frictional engagement with a perimeter or side of hub 130 to retain top 136 and hooks 138 in either the retaining position or the releasing position. In one implementation, top position retainer 140 additionally releasably secures top 136 to hub 1302 and providing axial separation of top 136 from hub 130. In yet another implementation, the perimeter of hub 130 includes a circumferential groove in which a tongue or other projection inwardly extending from top 136 is received, the projection slides within the groove to facilitate relative rotation of top 136 and hub 130 while retaining top 136 to hub 130. In one such implementation, the groove includes one or more detents in the floor of the groove to indicate when top 136 has been fully rotated to either the retaining position or the releasing position. In yet other implementations, top position retainer 140 may comprise other snaps, hooks, fasteners or the like for releasably retaining or securing top 136 in either the retaining position or the releasing position.

FIG. 18 illustrates example camera tree mount 320. Camera tree mount 320 is configured to support a camera 322 upon a tree 324. Camera tree mount 320 comprises camera support 330 and tree wrap 332. Camera support 330 comprises a structure to support camera 322 facing in a forward direction. In one implementation, camera support 330 comprises a housing of camera 322 itself. In yet another implementation, camera support 330 comprises a bracket, case, enclosure or other structure which is releasably joined to camera 322. For example, in one implementation, camera support 330 may comprise a cavity with bands straps that wrap about camera 322 to retain camera 322 against and within camera support 330. In another implementation, cameras four 330 may include snaps, clips or other structures that releasably retain camera 322 in place relative to camera support 330.

As further shown by FIG. 18, camera support 330 comprises a bulbous, convex, curved or rounded rear surface 340. The semi spherical or partially spherical or rounded shape of rear surface 340 facilitates positioning of camera support 330 in any of a variety of user selected angles orientations independent of the particular angle of the surface of the tree or tree branch against which rear surface 340 is held by tree wrap 332. For example, camera support 330 may be pivoted to support camera 322 in an upward orientation or in a downward orientation by simply repositioning what portion of the rounded or part spherical surface is abutted against the surface of tree 324. Likewise, camera support 330 may be pivoted to support camera so as to point to the left or subpoint to the right by simply repositioning what portion of the rounded or part spherical surface is abutted against the surface of tree 324.

FIG. 19 is a rear view of rear surface 340 while FIG. 20 is a sectional view of rear surface 340. As shown by FIGS. 19 and 20, in one implementation, where surface 340 comprise a plurality of pins, pimples or other projections 342 projecting from the rounded rear surface 340. Projection 342 are distributed across the surface 340 and facilitate gripping of the uneven surfaces of tree 324. In one implementation, such rejections 342 are resiliently compressible, such as being formed from rubber a rubber-like material, to grip and adapt to the various contours of the surface of the tree against which surface 340 is pressed by tree wrap 332.

Tree wrap 332 comprises a member to rap about tree 324 to retain and hold rear surface 340 against the outer surface of tree 324. In the example illustrated, tree wrap 332 comprises a flexible member 344 and a retainer 346. Flexible member comprises a strap, belt, cable or other flexible line that wraps about tree 324. Retainer 346 comprises a mechanism to secure opposite end portions of flexible member 344 to camera support 330. In one implementation, retainer 346 retains flexible member 344 at different positions relative to camera support 330 to adjust a length of the flexible member 344 forming the loop and wrapping about tree 324, accommodating different tree diameters or tree branch diameters.

In one implementation, retainer 346 comprises a pin configured to be received by any one of a series of apertures or sweats 348 formed in and along a length of flexible member 344. In yet another implementation, flexible member 344 comprises a belt, wherein retainer 346 comprises a belt buckle to be releasably secured to flexible member 344 at any of a variety of different spaced locations along flexible member 344. In yet another implementation, retainer 346 comprises part of a hook and loop fastener releasably securable to flexible member 344 having another portion of the hook and loop fastener.

FIG. 21 illustrate camera tree mount 420, another implementation of camera tree mount 320. Camera tree mount 420 similar to camera tree mount 320 except that camera tree mount 420 comprises retainer 446. FIG. 22 illustrates retainer 446 in more detail. As shown by FIG. 22, flexible member 344 comprises a tooth belt 450 having teeth 452. Retainer 446 comprises a sleeve or tube 460 through which belt 450 extends. Retainer 446 further comprises tooth retainer 464 and over center cam 466. Tooth retainer 464 extends through an opening into 460 and comprises teeth 470 having the same pitch and similar size as teeth 452. Tooth retainer 464 is movably coupled to tube 460 for movement between a first position in which teeth 470 mesh with teeth 452 and a second position in which teeth 470 are withdrawn from teeth 452. In the example illustrated, retainer 464 comprises a pair of slots 474 which slidably receive retaining pins 476 extending from tube 460. In one implementation, a spring or other bias is captured between retainer 464 and tube 462 resiliently biased retainer 464 towards the second to disengaged position.

Over center cam 466 is pivotally secured to retainer 464 by link 480. Rotation of over center cam 466 about axis 482 rotatable or center cam 466 between a retaining position (shown in FIG. 22) in which the over center cam 466 compresses retainer 464 in the direction indicated by arrow 484 into the first teeth inner meshing position. Rotation of over center cam 466 in the direction indicated by arrow 486 about axis 482 moves over center cam 466 to the releasing position, allowing teeth 472 be withdrawn from engagement with teeth 452. In the released position, belt 450 maybe slid through tube 460 to adjust its length. When at the desired length, a secure and tight grip about the tree, over center cam is rotated back to the retaining position shown in FIG. 22 to once again secure teeth 470 in engagement with teeth 452 and to retain belt 450 in its desired length.

FIG. 23 illustrates camera tree mount 520. Camera tree mount 520 is configured to support a camera 524 against a tree at and in a variety of different angular positions or orientations. Camera tree mount 520 comprises bracket 530, tree wrap 344 (described above) and arm 550. As shown schematically by FIG. 23, a ball 560 extends from one of bracket 540 and arm 550 while a socket extends from the other of bracket 540 and arm 560. The socket 562 receives the ball to facilitate universal pivoting rotational movement in 360°. As a result, arm 550 maybe selectively reposition and retained at any of a variety of different angles or orientations support camera 524 outwardly from tree 324. In one implementation, arm 550 is itself pivotably connected to camera 524 by a ball and socket joint. In yet another implementation, arm 550 is itself pivotably connected to yet one or more additional intermediate arms between arm 550 and camera 524.

FIGS. 24-25 illustrate camera tree mount 620, a particular implementation of camera tree mount 520. Camera tree mount 620 comprises bracket 640 having socket 662 which removably received arm row 650 having ball 660. The opposite sides of socket 662 originally biased away from one another by a compression spring 666 and are retained about ball 660 by an adjustable threaded screw 670. In the example illustrated, the end portion 672 of bracket 640 is pivotally secured to a base portion 674 to which tree wrap 344 is secured. In the example illustrated, base portion 674 and end portion 672 are pivotable and rotatable in selected orientations about axis 678.

FIG. 26 illustrates an alternative camera tree mount 720. In the example illustrated, camera tree mount 720 comprises an angled arm 722 having a screw portion 724 from a screwed into a tree and a ball portion 726 for being received within a socket associated with an arm that is connected to a camera. FIG. 27 illustrates camera tree mount 820. Camera tree mount a 20 comprises a bracket 840 secured to tree row 324 by tree wrap 344 (described above). Bracket 840 comprises a ball 826 for being received within a socket associated with an arm that is connected to a camera.

FIG. 28 is a perspective view of an example tree climbing step 900. Step 900 comprises screw portion 902 and step projection 904. Screw portion 902 is configured to be screwed into a tree. Step projection 904 projects away from the tree and is our quarter curved to assist a person imitating his or her footing upon projection 904. In the example illustrated, projection 904 and additionally includes serrations, grooves, ribs, temples or other structures 908 to inhibit slippage of a person's feet off of projection 904.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:
1. A spider hub pole retaining assembly comprising:
  a hub having a plurality channels extending radially outward in a plane;

a plurality of poles pivotably coupled to the hub near a center of the hub and pivotable between a first position in which the poles extend radially outwardly through the channels in the plane and a second position in which the poles extend away from the outside of the channels;
a spider hub pole retainer comprising:
a top to be positioned against and over the hub;
a plurality of hooks extending from the top so as to receive the poles when the poles are in the first position extending through the channels, wherein the top is configured to be rotatably supported on the hub to rotate about an axis between a retaining position in which the hooks extend opposite the channels and a releasing position in which the hooks are angularly offset with respect to the channels; and
a top position retainer to releasably secure the top in the retaining position, the retainer extending through the top into engagement with the hub at a location eccentric to the axis.

2. The spider hub pole retaining assembly of claim 1, wherein the top position retainer comprises at least one threaded member extending through the top for selective engagement with the hub.

3. The spider hub pole retaining assembly of claim 1, wherein the plurality of hooks each face in a circumferential direction about a rotational axis of the top.

4. A spider hub pole retaining assembly comprising:
a hub having a plurality channels extending radially outward in a plane;
a plurality of poles pivotably coupled to the hub near a center of the hub and pivotable between a first position in which the poles extend radially outwardly through the channels in the plane and a second position in which the poles extend away from the outside of the channels; and
a spider hub pole retainer comprising:
a top rotatably supported by the hub, the top having a circumferential side wall encircling a rotational axis of the top;
a plurality of hooks extending from the circumferential sidewall of the top, wherein the top is rotatable between a retaining position in which the plurality of hooks receive the poles when the poles are in the first position extending through the channels and a releasing position in which the plurality of hooks are angularly offset with respect to the channels to facilitate withdrawal of the poles from the channels; and
a top position retainer extending through the circumferential sidewall of the top into engagement with the hub.

5. The spider hub pole retainer assembly of claim 4, wherein the top is configured to be rotatably supported on the hub to rotate between a retaining position in which the hooks extend opposite the channels and a releasing position in which the hooks are angular offset with respect to the channels.

6. The spider hub pole retainer assembly of claim 4, wherein the top position retainer comprises at least one threaded member extending through the circumferential sidewall of the top for selective engagement with the hub.

7. The spider hub pole retainer assembly of claim 4, wherein the plurality of hooks each face in a circumferential direction about a rotational axis of the top.

8. The spider hub pole retainer assembly of claim 4, wherein the hub comprises sidewalls through which the channels extend, the sidewalls surrounding the plurality of poles.

9. A blind comprising:
a panel forming an enclosure having an interior;
a spider hub pole retainer assembly coupled to the panel exterior to the panel and the interior of the enclosure, the spider hub pole retainer assembly to selectively maintain the panel in an extended state, the spider hub pole retainer assembly comprising:
a hub having a plurality channels extending radially outward in a plane, each of the channels opening in a direction towards a center of the interior;
a plurality of poles pivotably coupled to the hub near a center of the hub and pivotable between a first position in which the poles extend radially outwardly through the channels in the plane and a second position in which the poles extend away from the outside of the channels; and
a spider hub pole retainer comprising:
a top rotatably supported by the hub such that the panel is sandwiched between the top and the interior;
a plurality of hooks extending from the top, wherein the top is rotatable between a retaining position in which the plurality of hooks receive the poles when the poles are in the first position extending through the channels and a releasing position in which the plurality of hooks are angularly offset with respect to the channels to facilitate withdrawal of the poles from the channels.

10. The blind of claim 9, wherein the top is configured to be rotatably supported on the hub to rotate between a retaining position in which the hooks extend opposite the channels and a releasing position in which the hooks are angular offset with respect to the channels.

11. The blind of claim 10 further comprising a top position retainer to releasably secure the top in the retaining position.

12. The blind of claim 11, wherein the top position retainer comprises at least one threaded member extending through a circumferential sidewall of the top for selective engagement with the hub.

13. The blind of claim 9, wherein the plurality of hooks each face in a circumferential direction about a rotational axis of the top.

14. The blind of claim 9, wherein the hub comprises sidewalls through which the channels extend, the sidewalls surrounding the plurality of poles.

* * * * *